(12) United States Patent
Bucks et al.

(10) Patent No.: US 6,952,989 B2
(45) Date of Patent: Oct. 11, 2005

(54) APPARATUS FOR CUTTING FOOD PRODUCT

(75) Inventors: Brent L. Bucks, Valparaiso, IN (US); Daniel W. King, Valparaiso, IN (US)

(73) Assignee: Urschel Laboratories, Inc., Valparaiso, IN (US)

( * ) Notice: Subject to any disclaimer, the term of this patent is extended or adjusted under 35 U.S.C. 154(b) by 0 days.

(21) Appl. No.: 10/605,543

(22) Filed: Oct. 7, 2003

(65) Prior Publication Data

US 2004/0103798 A1 Jun. 3, 2004

Related U.S. Application Data

(60) Provisional application No. 60/416,653, filed on Oct. 7, 2002.

(51) Int. Cl.[7] .......................... B23D 19/00; B26D 7/06; B26D 5/00
(52) U.S. Cl. .............................. 83/703; 83/98; 83/177; 83/400; 83/402; 83/418; 83/444; 83/932; 83/DIG. 1
(58) Field of Search .......................... 83/24, 422, 177, 83/733, 932, DIG. 1, 444, 438, 703, 22, 402, 418, 98, 594, 595, 399, 400; 193/33, 34, 46; 138/37, 39, 177, DIG. 11; 99/537, 541, 543, 545, 567, 588, 589

(56) References Cited

U.S. PATENT DOCUMENTS 3,964,873 A * 6/1976 Aramaki et al. ............ 422/201
3,998,254 A * 12/1976 Morin ........................ 144/35.1
4,095,751 A 6/1978 Artin
4,546,684 A 10/1985 Bellerose

FOREIGN PATENT DOCUMENTS

| CA | 2309594 | 5/1999 | |
|----|---------|--------|---|
| DE | 3546506 | 3/1987 | |
| DE | 10057835 | 8/2002 | |
| JP | 63222038 A | * 9/1988 | ........... C03B/37/16 |

* cited by examiner

Primary Examiner—Allan N. Shoap
Assistant Examiner—Isaac N Hamilton
(74) Attorney, Agent, or Firm—Hartman & Hartman; Gary M. Hartman; Domenica N.S. Hartman

(57) ABSTRACT

A food product cutting apparatus that makes a substantially horizontal cut through food product being delivered in a substantially vertical direction. The food product is delivered to a cutting device through an internal passage of at least one feed member above the cutting device. A force is applied to the food product traveling downward through the internal passage so as to push the food product against a first wall of the feed member. The apparatus is configured to improve product flow by configuring the passage of the feed member to have a cross-sectional shape defined by two offset, overlapping diameters. The apparatus is also configured for improved safety by ensuring that the cutting device is properly secured before electrical power is available for driving the cutting device.

20 Claims, 2 Drawing Sheets

APPARATUS FOR CUTTING FOOD PRODUCT

CROSS REFERENCE TO RELATED APPLICATIONS

This application claims the benefit of U.S. Provisional Application Ser. No. 60/416,653, filed Oct. 7, 2002. In addition, this application is related to U.S. patent application Ser. No. 10/250,113, filed Jun. 4, 2003, and copending U.S. patent application Ser. No. 10/072,494, filed Feb. 4, 2002, the contents of which are incorporated herein by reference.

BACKGROUND OF INVENTION

1. Field of the Invention

The present invention generally relates to cutting methods and equipment, particularly for use in slicing food product. More particularly, this invention relates to an apparatus equipped with a cutting device having a substantially horizontal cutting plane, wherein the apparatus delivers stabilized food product to the cutting device and electric power to the cutting device is prevented unless the cutting device is properly installed on the apparatus.

2. Description of the Related Art

Commonly-assigned U.S. patent application Ser. Nos. 10/072,494 and 10/250,113 disclose methods and apparatuses for delivering food product to a horizontal cutting wheel, by which the product is properly oriented and stabilized to produce a sliced product of uniform thickness. The horizontal cutting wheel is contained within an enclosure that defines a chute from whose lower end the sliced food product exits the apparatus. The enclosure is supported by a frame that houses the electrical wiring to a motor within the enclosure for driving the cutting wheel. Feed tubes are mounted generally perpendicular to the cutting wheel, and each feed tube is sized such that products (e.g., round and/or elongate potatoes) are fed single-file to the cutting wheel.

Each feed tube is preferably equipped with means, preferably multiple water jets discharged by nozzles mounted in a wall of the tube. According to Ser. No. 10/072,494, the nozzles are preferably arranged in pairs so that jets discharged therefrom intersect near the wall of the feed tube opposite the nozzles, while Ser. No. 10/250,113 allows the jets to impact the surface of the cutting wheel. In each case, the nozzles are adjusted to direct the jets in a downward incline toward the cutting wheel to assist in stabilizing the product and assist in feeding the product downward through the tubes.

According to Ser. No. 10/250,113, smooth (unsplined) feed tubes reduce jamming of the product. Smooth feed tubes may have a smooth tapered flare to trap and center round potatoes against the cutting wheel. The opening of the tube may be asymmetrical as a result of the flare being formed on less than the entire diameter of the tube. Alternatively, smooth feed tubes may have a stepped (ribbed) tapered flare. According to an optional aspect of Ser. No. 10/250,113, product can be stabilized by equipping the feed tubes with splines. Splined feed tubes may have an unflared opening, a smooth tapered flare, or a stepped (ribbed) tapered flare.

Ser. No. 10/250,113 also discloses mounting the cutting wheel in a manner that does not require tools for replacement. The cutting wheel is trapped between an upper housing and a wheel support within a lower housing, whereby the upper and lower housings together define an enclosure for the cutting wheel. The upper housing is raised and lowered relative to the lower housing with a crank mounted to the frame, with the force required to hold the cutting wheel in place being applied by the upper housing through operation of the crank.

While the apparatuses disclosed in U.S. patent application Ser. Nos. 10/072,494 and 10/250,113 make possible the vertical feeding of round and elongate food products to a horizontal cutting wheel to produce a sliced product of uniform thickness, further improvements are still desirable.

SUMMARY OF INVENTION

The present invention provides a food product cutting apparatus that comprises cutting means for making a substantially horizontal cut through food product being delivered thereto in a substantially vertical direction. The food product is delivered through at least one feed member above the cutting means. The feed member comprises an internal passage defining an opening in proximity to the cutting means for delivering the food product to the cutting means. The internal passage is defined by diametrically-opposed first and second walls of the feed member, and the apparatus comprises means for applying a force to the food product traveling downward through the internal passage so as to push the food product against the first wall of the feed member as the cutting means is making a substantially horizontal cut through the food product.

According to a first aspect of the invention, each of the first and second walls has a radius of curvature transverse to the internal passage, and the radius of curvature of the first wall has a center that is offset from a center of the radius of curvature of the second wall so that the internal passage has a cross-sectional shape defined by two offset, overlapping diameters. According to a second aspect of the invention, the cutting means is contained in a lower housing member of the apparatus, and an upper housing member of the apparatus is located above the cutting means. The upper housing member has first and second positions relative to the cutting means, in which the upper housing member is engaged with the lower housing member and applies a clamping load to the cutting means so as to secure the cutting means within the lower housing member when the upper housing member is in the first position thereof. The upper housing member is disengaged from the lower housing member and releases the clamping load on the cutting means when the upper housing member is in the second position thereof. Finally, the apparatus includes means for preventing electrical current flow to the cutting means when the upper housing is not in the first position thereof.

A food product cutting apparatus configured in accordance with the above is capable of improved product flow and improved safety. The former is achieved with a feed member configured in accordance with the first aspect of the invention, while the latter is achieved by ensuring that the cutting means is properly secured before electrical power is available for driving the cutting means, and that access is prevented to the cutting means while supplied with electrical power. In this regard, the invention generally provides improvements over the methods and apparatuses disclosed in U.S. patent application Ser. Nos. 10/072,494 and 10/250,113.

Other objects and advantages of this invention will be better appreciated from the following detailed description.

DETAILED DESCRIPTION

Figure 1:
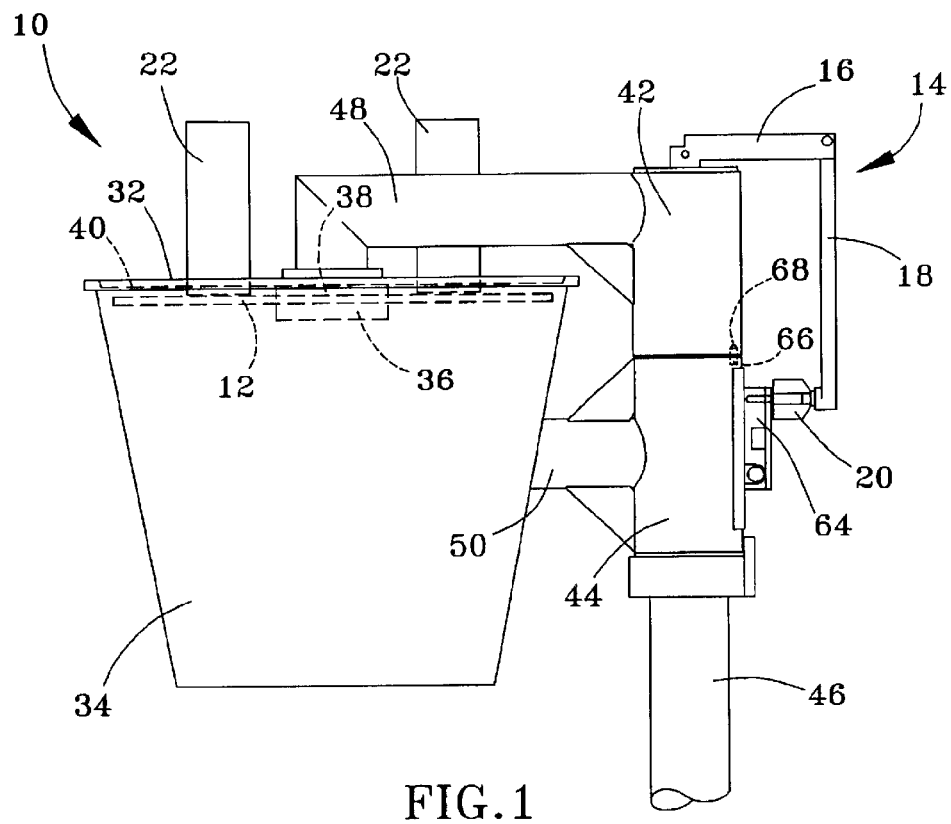
FIG. 1 is a side view a cutting apparatus in accordance with this invention, showing a safety crank operable to raise and lower an upper housing of the apparatus relative to a lower housing of the apparatus, and showing the safety crank in an engaged position at which time the upper housing is lowered onto the lower housing.
Figure 2:
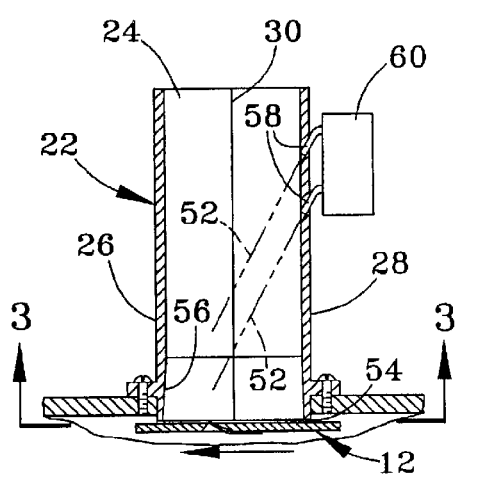
FIG. 2 is a longitudinal cross-sectional view of a feed tube of the cutting apparatus of FIG. 1.

FIGS. 1 through 5 show portions of a cutting (slicing) machine 10 having a horizontal cutting wheel 12 equipped with multiple blades, and feed tubes 22 mounted above the wheel 12 for delivering products, such as potatoes, for slicing. Each feed tube 22 has an internal passage 24 that is sized such that products (e.g., round and/or elongate potatoes) are fed single-file to the cutting wheel 12. As shown in FIG. 2, and in accordance with copending U.S. patent application Ser. No. 10/072,494, each feed tube 22 is equipped with nozzles 58 that discharge fluid (e.g., water) jets 52 for holding product against a first wall 26 of the tube 22. The nozzles 58 are preferably arranged in sets of two or more on a second wall 28 of the tube 22 diametrically opposite the first wall 26, with each nozzle set producing jets 52 that converge toward the first wall 26 opposite the nozzles 58. The jets 52 preferably intersect at or near the first wall 26 directly above the exit point of the cutting wheel blades as they pass beneath the tube opening 54 while moving in a direction toward the first wall 26 (FIG. 2). Two sets of nozzles 58, one set being vertically spaced above the other set, are represented in FIG. 2 in accordance with a preferred embodiment of the invention. The fluid preferably flows to the nozzles 58 from a manifold 60 located near or on the tube 22 so as to better ensure that substantially the same pressure is present at all of the nozzles 58.

The water jets 52 within each feed tube 22 are directed downward toward the cutting wheel 12 at an angle of less than forty-five degrees relative to the second wall 28 of the tube 22. Accordingly, with vertically oriented tubes 22 as shown in the Figures, the jets 52 are directed downward at an angle of less than forty-five degrees from vertical (greater than forty-five degrees from horizontal). A preferred angle for each jet 52 is about twenty-five degrees from vertical (about sixty-five degrees from horizontal). This orientation has been found to improve stabilization and feeding of product through the feed tubes 22 when each set of nozzles 58 produces two fluid jets 52. In practice, good results have been obtained with paired nozzles 58 having orifice diameters of about 0.156 inch and supplied with water at pressures of about 30 to 70 psi (about 2 to about 5 bar), preferably about 30 to 40 psi (about 2 to about 3 bar). It is believed that a set of three nozzles 58 having orifice diameters of about 0.108 inch will produce similar results. Notably, stabilization and product feed-through is improved with a tube 22 configured in accordance with FIGS. 2 and 3 over that disclosed in U.S. patent application Ser. No. 10/072,494, which discloses jets at angles of greater than forty-five degrees from vertical (up to about forty-five degrees from horizontal).

Figure 3:
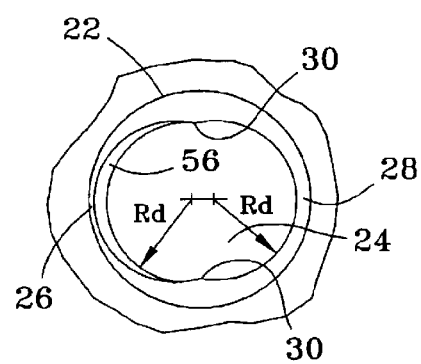
FIG. 3 is an end view of the lower end of the feed tube of FIG. 2.

As evident from FIG. 3, another aspect of the invention is that the internal passage 24 of each feed tube 22 is defined by two offset overlapping diameters. More particularly, the first and second walls 26 and 28 defining the passage 24 of each tube 22 have radii of curvature (Rd) whose centers are located on axes that are offset in a direction transverse to the passage 24. As a result, the passage 24 has a cross-sectional shape defined by two offset, overlapping diameters, resulting in the presence of longitudinal ridges 30 at the intersections of the walls 26 and 28. The radii of curvature Rd are preferably the same for the walls 26 and 28. In practice, suitable results have been obtained using radii of curvature Rd of about 2.125 inches (about 54 mm) and an offset of about 5/16 inch (about 8 mm) between centers.

As also evident from FIGS. 2 and 3, each tube 22 is preferably formed to have a smooth tapered flare 56 at its lower end, which defines an opening 54 to the tube 22 adjacent the cutting wheel 12. As depicted in FIG. 3, the flare 56 is continuous but limited to the first wall 26 of the tube 22, with the result that the opening 54 of the tube 22 is asymmetrical. The flare 56 has a radius of curvature transverse to the internal passage 24 that increases in the direction toward the opening 54, so that the portion of the opening 54 defined by the flare 56 has a larger radius of curvature than that part of the opening 54 defined by the second wall 28 of the tube 22. The presence of the tapered flare 56 configured as shown in FIGS. 2 and 3 has been shown to improve trapping and centering of round potatoes against the cutting wheel 12, thereby producing a sliced product of uniform thickness. Other than the flare 56 and ridges 30, the interior surface of the passage 24 of each feed tube 22 is preferably smooth and unsplined to reduce product jamming within the tubes 22. However, feed tubes 22 with splines and/or a stepped (ribbed) tapered flare in accordance with U.S. patent application Ser. No. 10/250,113 could be used with this invention if necessary to further promote product stability and/or reduce product roll, respectively.

Figure 4:
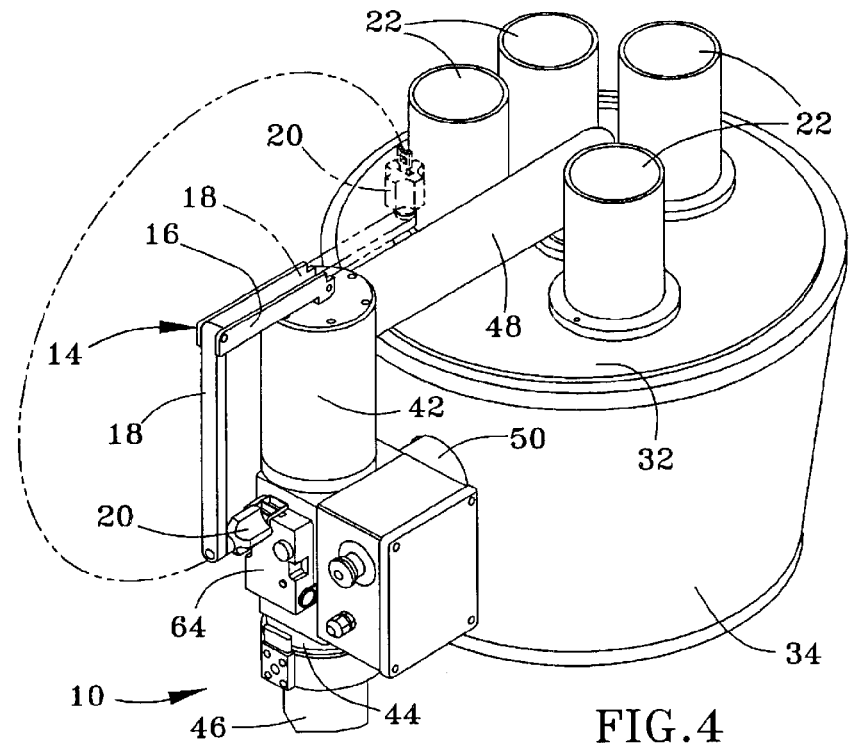
FIG. 4 is a perspective view of a portion of the cutting apparatus of FIG. 1, illustrating engaged and disengaged positions of the safety crank.
Figure 5:
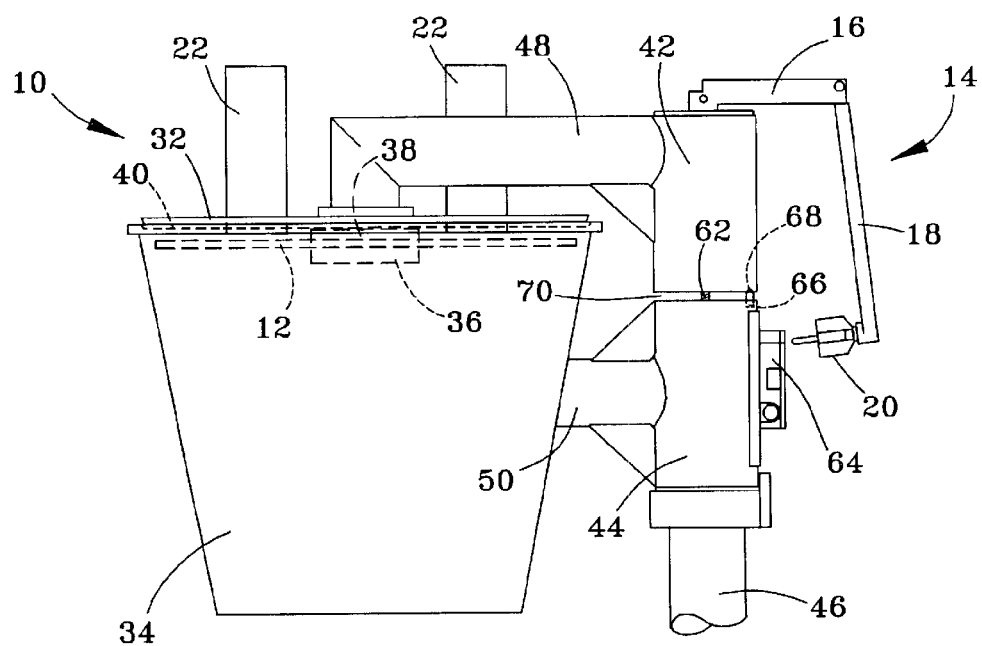
FIG. 5 is a side view showing the safety crank misaligned as a result of the upper housing being incompletely lowered.

FIGS. 1, 4 and 5 illustrate a preferred feature of the invention associated with the capability of removing and installing the cutting wheel 12 without the use of tools. As discussed in U.S. patent application Ser. No. 10/250,113, the cutting wheel 12 is trapped between an upper movable housing (lid) 32 and a wheel support 36 on which the wheel 12 is mounted within a lower housing 34 of the machine 10, as schematically represented in FIG. 1. A clamping force is applied to the cutting wheel 12 with the lid 32 through a bearing cap 38 fitted to a central hub (not shown) of the wheel 12. The lid 32 is received in an annular recess 40 defined in a rim portion of the lower housing 34, and both the lid 32 and recess 40 preferably have mating tapered peripheral edges that promote alignment of the lid 32 with the lower housing 34 as the lid 32 is lowered with a crank 14 onto the lower housing 34. The cutting wheel 12 is preferably located within the lower housing 34 such that the center of the lid 32 is deflected a controlled distance downward when the lid 32 is forced onto the lower housing 34 by operation of the crank 14 to capture the cutting wheel 12.

It is desirable that the machine 10 can be operated with the cutting wheel 12 consistently secured under a clamping load time after time without using tools and permanent fasteners that could be improperly used or lost. It is also desirable that the machine 10 cannot be opened or accessed during operation so as to avoid personal injury while the cutting wheel 12 is rotating. Finally, it is preferred that the cutting zone of the machine does not have electrical components and connections that could complicate the mechanical design and pose future maintenance issues. To address these concerns, the machine 10 is depicted in FIGS. 1, 4 and 5 as equipped so that the force applied to clamp the lid 32 to the lower housing 34, and thereby secure the cutting wheel 12, is generated by a screw (62 in FIG. 5) housed within upper and lower frame members 42 and 44 supported on a frame pedestal 46. In FIGS. 1, 4 and 5, the lid 32 can be seen as secured to an arm 48 extending from the upper frame member 42, while the lower housing 34 is secured to an arm 50 extending from the lower frame member 44. The lower frame member 44 is adapted to swivel on the pedestal 46, while the upper frame member 42 is adapted to be raised and lowered relative to the lower frame member 44 through the action of the screw 62. In this manner, the lid 32 can be raised and lowered relative to the lower housing 34, and the lower housing 34 can be swiveled out of alignment with the lid 32.

The screw 62 is operated with the crank 14, which is shown as comprising a two-piece assembly including a first connecting rod 16 secured to the screw 62 above the upper frame member 42, and a second connecting rod 18 pivotally connected to the first connecting rod 16 and equipped with a guard-locking key 20 located on its end opposite the first connecting rod 16. A guard-locking switch 64 is mounted to the lower frame member 44, into which the key 20 must be plugged in order to complete the power circuit for operating the machine 10. The length of the second connecting rod 18 is such that the key 20 cannot be inserted into the switch 64 unless the crank 14 has been rotated a sufficient number of revolutions to lower the lid 32 and securely clamp the wheel 12 within the lower housing 34, and to also radially align the key 20 with the switch 64. Comparing the lowered-engaged and raised-disengaged positions of the crank 14 portrayed in FIG. 4, the lowered position of the crank 14 preferably reduces the mechanical advantage of the crank 14 if an attempt is made to raise the lid 32.

To further illustrate the above, FIG. 1 shows the crank 14 as having been properly operated to lower the lid 32 onto the lower housing 34, clamp the cutting wheel 12 within the lower housing 34, and permit insertion of the key 20 into the switch 64. FIG. 1 also shows the lower frame member 44 as being equipped with a pin 66 that has been inserted in a bore 68 formed in the upper frame member 42. The pin 66 ensures that the lid 32 and lower housing 34 cannot be mated unless the upper and lower frame members 42 and 44, and therefore the upper and lower housing 32 and 34 and the key 20 and switch 64, are properly angularly aligned with each other. In FIG. 5, though the upper and lower frame members 42 and 44 are properly angularly aligned, the lid 32 has not been sufficiently lowered relative to the lower housing 34, with the result that the cutting wheel 12 is not adequately clamped within the lower housing 34. In this situation, though vertically aligned with the switch 64, the key 20 cannot be inserted into the switch 64 because the upper frame member 42 (supporting the lid 32) has not been sufficiently lowered relative to the lower frame member 44, as evidenced by a gap 70 between the upper and lower frame members 42 and 44. Obviously, the key 20 also cannot be inserted into the switch 64 if the crank 14 (and therefore the key 20) is not radially aligned with the switch 64.

While the invention has been described in terms of particular embodiments, it is apparent that other forms could be adopted by one skilled in the art. For example, features of this invention could be used in combination with one or more features of commonly-assigned U.S. patent application Ser. Nos. 10/072,494 and 10/250,113. Accordingly, it should be understood that the invention is not limited to the specific embodiments illustrated in the Figures. It should also be understood that the phraseology and terminology employed above are for the purpose of disclosing the illustrated embodiments, and do not necessarily serve as limitations to the scope of the invention. Therefore, the scope of the invention is to be limited only by the following claims.

What is claimed is:

1. An apparatus for cutting food product, the apparatus comprising:

means for making a substantially horizontal cut through a food product being delivered thereto in a substantially vertical direction;

at least one feed member above the cutting means, the feed member comprising an internal passage that defines an opening in proximity to the cutting means for delivering the food product to the cutting means in a substantially vertical direction, the internal passage being defined by diametrically-opposed first and second walls of the feed member, each of the first and second walls having a radius of curvature transverse to the internal passage, the radius of curvature of the first wall having a center that is offset from a center of the radius of curvature of the second wall so that the internal passage has a cross-sectional shape defined by two offset, overlapping diameters; and means for applying a force to the food product traveling downward through the internal passage so as to push the food product against the first wall of the feed member as the cutting means is making a substantially horizontal cut through the food product.

2. An apparatus according to claim 1, wherein the feed member has a lower portion adjacent the opening and an upper portion above the lower portion, the lower portion having a lower extremity that defines the opening of the internal passage, the first wall within the lower portion having a flared region with a radius of curvature transverse to the internal passage that increases in a direction toward the opening so that a portion of the opening is defined by the flared region and has a larger radius of curvature than the second wall within the lower portion of the feed member.

3. An apparatus according to claim 2, wherein the force applying means urges the food product toward the flared region of the lower portion as the cutting means is making a substantially horizontal cut through the food product.

4. An apparatus according to claim 2, wherein the flared region of the lower portion is continuous on the first wall within the lower portion of the feed member.

5. An apparatus according to claim 2, wherein the flared region of the lower portion is limited to the first wall within the lower portion of the feed member.

6. An apparatus according to claim 1, wherein the force applying means comprises at least two fluid jets flowing across the internal passage from the second wall toward the first wall so as to impact the food product as the food product travels downward through the internal passage.

7. An apparatus according to claim 6, wherein the at least two fluid jets converge toward the first wall of the internal passage.

8. An apparatus according to claim 7, wherein the cutting means comprises blades that pass beneath the opening in a direction toward an exit point of the first wall within the lower portion, and the fluid jets intersect at the first wall directly above the exit point.

9. An apparatus according to claim 6, wherein each of at least two jets are directed downward toward the cutting means at an angle of less than forty-five degrees from the second wall of the feed member.

10. An apparatus according to claim 6, further comprising:

a lower housing member in which the cutting means is contained;

an upper housing member to which the feed member is mounted, the platform being above the cutting means and having first and second positions relative to the cutting means, the upper housing member being engaged with the lower housing member and applying a clamping load to the cutting means so as to secure the cutting means within the lower housing member when the upper housing member is in the first position thereof, the upper housing member being disengaged from the lower housing member and releasing the clamping load on the cutting means when the upper housing member is in the second position thereof;

means for permitting rotation of the cutting means while under the clamping load applied by the upper housing member; and means for moving the upper housing member toward and away from the lower housing member so as to apply and release the clamping load to the cutting means.

11. An apparatus according to claim 10, further comprising complementary first and second connectors mounted to the apparatus, the first and second connectors delivering electric current to the cutting means when connected to each other and interrupting electric current to the cutting means when disconnected from each other, the first connector being mounted on the moving means and being connectable with the second connector only when the upper housing member is in the first position thereof wherein the upper housing member is engaged with the lower housing member and applies the clamping load to the cutting means so as to secure the cutting means within the lower housing member.

12. An apparatus according to claim 11, wherein the moving means comprises a crank assembly and the first connector is mounted to the crank assembly.

13. An apparatus according to claim 12, wherein the moving means further comprises a screw coupled to the crank assembly, the screw being operable to vertically raise and lower the upper housing member between the first and second positions thereof when the crank assembly is rotated.

14. An apparatus for cutting food product, the apparatus comprising:

means for making a substantially horizontal cut through a food product being delivered thereto in a substantially vertical direction;

at least one feed member above the cutting means, the feed member comprising an internal passage that defines an opening in proximity to the cutting means for delivering the food product to the cutting means in a substantially vertical direction, the internal passage being defined by diametrically-opposed first and second walls of the feed member;

means for applying a force to the food product traveling downward through the internal passage so as to push the food product against the first wall of the feed member as the cutting means is making a substantially horizontal cut through the food product;

a lower housing member in which the cutting means is contained;

an upper housing member above the cutting means and having first and second positions relative to the cutting means, the upper housing member applying a clamping load to the cutting means so as to secure the cutting means within the lower housing member when the upper housing member is in the first position thereof, the upper housing member releasing the clamping load on the cutting means when the upper housing member is in the second position thereof;

means for permitting rotation of the cutting means while under the clamping load applied by the upper housing member in the first position thereof; and means for preventing electrical current flow to the cutting means when the upper housing is not in the first position thereof.

15. An apparatus according to claim 14, further comprising means for moving the upper housing member toward and away from the lower housing member so as to apply and release the clamping load to the cutting means.

16. An apparatus according to claim 15, wherein the preventing means comprises complementary first and second connectors mounted to the apparatus, the first and second connectors delivering electric current flow to the cutting means when connected to each other and interrupting electric current to the cutting means when disconnected from each other, the first connector being mounted on the moving means and being connectable with the second connector only when the upper housing member is in the first position thereof wherein the upper housing member applies the clamping load to the cutting means so as to secure the cutting means within the lower housing member.

17. An apparatus according to claim 16, wherein the moving means comprises a crank assembly and the first connector is mounted to the crank assembly.

18. An apparatus according to claim 17, wherein the moving means further comprises a screw coupled to the crank assembly, the screw being operable to vertically raise and lower the upper housing member between the first and second positions thereof when the crank assembly is rotated.

19. An apparatus according to claim 14, wherein each of the first and second walls of the feed member have a radius of curvature transverse to the internal passage, the radius of curvature of the first wall has a center that is offset from a center of the radius of curvature of the second wall so that the internal passage has a cross-sectional shape defined by two offset overlapping diameters, the feed member has a lower portion adjacent the opening, the lower portion has a lower extremity that defines the opening of the internal passage, the first wall within the lower portion has a flared region with a radius of curvature transverse to the internal passage that increases in a direction toward the opening so that a portion of the opening is defined by the flared region and has a larger radius of curvature than the second wall within the lower portion of the feed member, and the force applying means forces the food product into contact with the flared region of the lower portion as the cutting means is making a substantially horizontal cut through the food product.

20. An apparatus according to claim 14, wherein the force applying means comprises at least two fluid jets flowing across the internal passage from the second wall toward the first wall so as to impact the food product as the food product travels downward through the internal passage.

* * * * *